W. JOHNSON & M. RANNEY.
Shovel-Plows.
No. 138,656.   Patented May 6, 1873.
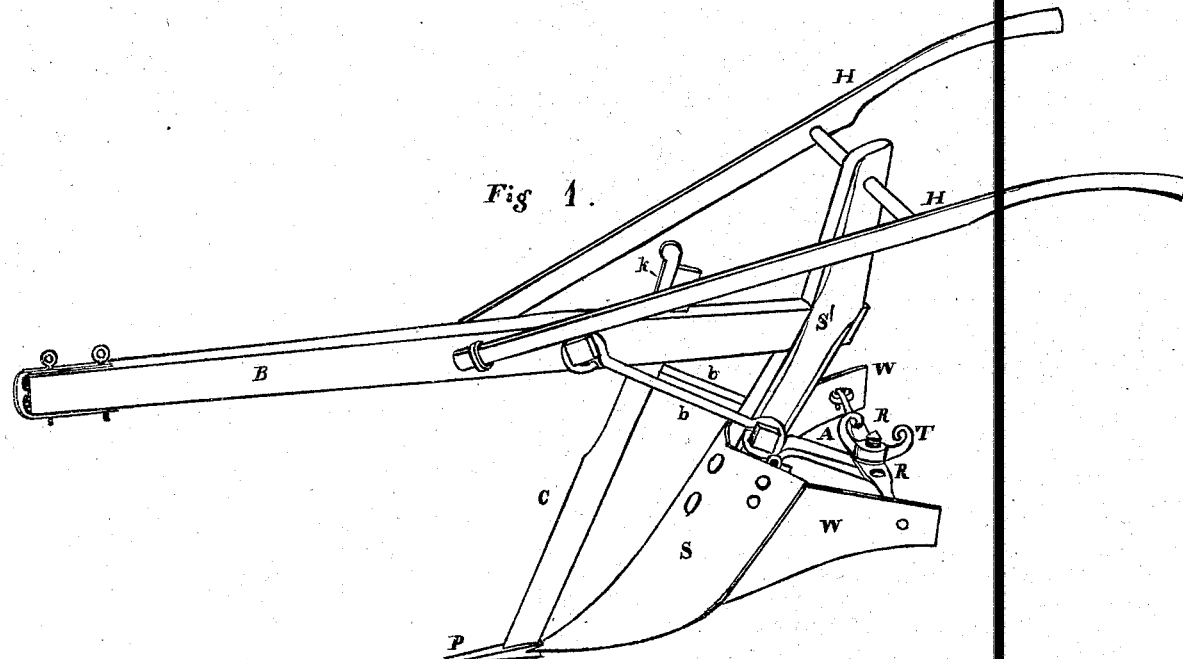
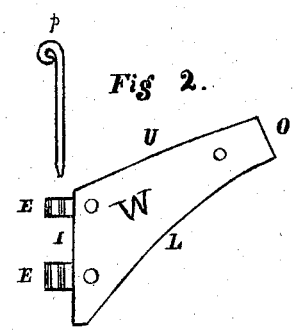
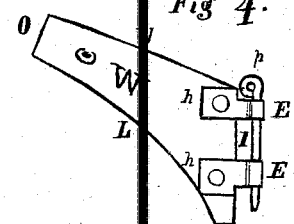
Witnesses=
H. B. Foster.
W. M. Beebe
Inventors
Wellington Johnson
Moses Ranney

UNITED STATES PATENT OFFICE.

WELLINGTON JOHNSON AND MOSES RANNEY, OF NORTHFIELD, OHIO.

IMPROVEMENT IN SHOVEL-PLOWS.

Specification forming part of Letters Patent No. 138,656, dated May 6, 1873; application filed February 14, 1871.

*To all whom it may concern:*

Be it known that we, WELLINGTON JOHNSON and MOSES RANNEY, of Northfield, in the county of Summit and State of Ohio, have invented certain new and useful Improvements in Shovel-Plows, the object of which is to furnish an implement which is simple in construction, convenient in operation, and durable in use; and it consists in the construction and arrangement of parts as hereinafter more fully described and pointed out by the claim; and we do hereby declare that the following is a full, clear, and exact description thereof, which will enable others skilled in the art to which it appertains to make and use the same, reference being had to the drawing with letters of reference marked thereon, in which—

Figure 1 is a perspective view of an implement embodying our invention. Figs. 2, 3, and 4 are details of the same.

B represents the beam, provided with a suitable clevis, and, extending backward, is supported at the rear by the standard S', said beam and standard supporting the handles in the usual manner. To the bottom of the standard S' is secured a double shovel, S, the point of which fitting a notched supplemental point, P, which is also attached to the colter C, said colter passing through a mortise in the beam B, and securely held in place by the wedge $k$. The object of this colter attachment with a double shovel-plow is, that in hard ground, or where there is sod, the shovel will not break the ground; but by the use of the colter the ground is cut in advance of the shovel, and all strain upon the point of the same is relieved by the supplemental point P. The colter C and point P may instantly be removed by loosening the wedge $k$. The standard S' and beam are provided with two braces, $b\ b$, placed upon the outside of the beam and standard to allow the colter C to be set back in proper position. W W represent the wings, which are hinged to the shovel S, upon either side of the same, each wing being provided with a link, R, which is secured to an arm, A, extending backward from the standard S'. Said links R are secured to the arm A by a bolt and thumb-nut, T. This arrangement allows of the adjustment of the wings nearer to or further from each other, as desired; and by the use of the arm A the links R R stand at right angles to the line of direction, so that the pressure upon the wings from either side bears directly upon each other.

The wings may be quickly removed from the implement, when desired, leaving the shovel S to be used alone, or with the colter and supplemental point, or all together, as desired.

Having thus fully described our invention, what we claim, and desire to secure by Letters Patent, is—

The shovel S, removable point P, and colter C, braces $b\ b$, and removable and adjustable wings W W, all constructed and arranged for operation as and for the purpose described.

WELLINGTON JOHNSON.
MOSES RANNEY.

Witnesses:
H. B. FOSTER,
W. M. BEEBE.